United States Patent
Dharmistan

(10) Patent No.: US 8,510,464 B2
(45) Date of Patent: Aug. 13, 2013

(54) MEASURING DELAYS FROM CONTENT SERVERS TO NETWORK DEVICES ON PATHS TO A CLIENT SUCH AS FOR USE IN SELECTING A CONTENT SERVER BASED ON A COMMON NETWORK DEVICE

(75) Inventor: Shailendra Dharmistan, Karnataka (IN)

(73) Assignee: Cisco Technology, Inc., San Jose, CA (US)

(*) Notice: Subject to any disclaimer, the term of this patent is extended or adjusted under 35 U.S.C. 154(b) by 1266 days.

(21) Appl. No.: 11/701,026

(22) Filed: Jan. 31, 2007

(65) Prior Publication Data

US 2008/0155093 A1 Jun. 26, 2008

(30) Foreign Application Priority Data

Dec. 20, 2006 (IN) .......................... 2744/DEL/2006

(51) Int. Cl.
*G06F 15/173* (2006.01)
*G06F 15/16* (2006.01)
*G01R 31/08* (2006.01)
*H04L 12/28* (2006.01)

(52) U.S. Cl.
USPC ........... 709/238; 709/224; 709/203; 370/238; 370/351

(58) Field of Classification Search
USPC ................................................. 709/224, 238
See application file for complete search history.

(56) References Cited

U.S. PATENT DOCUMENTS

| | | | |
|---|---|---|---|
| 6,446,121 B1 | 9/2002 | Shah et al. | |
| 6,587,438 B1 * | 7/2003 | Brendel | 370/238 |
| 6,606,643 B1 * | 8/2003 | Emens et al. | 709/203 |
| 6,795,858 B1 | 9/2004 | Jain et al. | |
| 6,856,991 B1 | 2/2005 | Srivastava | |
| 7,047,315 B1 | 5/2006 | Srivastava | |
| 7,062,562 B1 | 6/2006 | Baker et al. | |
| 7,080,138 B1 | 7/2006 | Baker et al. | |
| 7,088,718 B1 | 8/2006 | Srivastava | |
| 7,284,051 B1 * | 10/2007 | Okano et al. | 709/226 |
| 7,444,428 B1 * | 10/2008 | Kuo et al. | 709/242 |
| 2002/0141343 A1 * | 10/2002 | Bays | 370/235 |
| 2003/0204619 A1 * | 10/2003 | Bays | 709/238 |

OTHER PUBLICATIONS

Stemm et al, "A Network Measurement Architecture for Adaptive Applications," INFOCOM 2000, Nineteenth Annual Joint Conference of the IEEE Computer and Communications Societies. Proceedings. vol. 1, Mar. 26-30, 2000 pp. 285-294 vol. 1.

* cited by examiner

*Primary Examiner* — Noel Beharry
(74) *Attorney, Agent, or Firm* — The Law Office of Kirk D. Williams

(57) ABSTRACT

Time delays from content servers to network devices on paths to a client are measured such as for, but not limited to, their use in selecting a content server based on a common network device. After identifying multiple context servers for possibly providing content to a client, time delays to multiple network devices along the path from each candidate content server to the client are measured, such as by the servers and/or probe agents associated therewith. The time delays to one or more network devices common to multiple content servers are analyzed to select one of the content servers, typically by selecting a smallest delay to a common network device. The operations involved in identifying delays to multiple network devices, as well as the operations involved in making a selection based on a delay to a common network device may be used in an extensible number of applications.

26 Claims, 7 Drawing Sheets

MEASURING DELAYS FROM CONTENT SERVERS TO NETWORK DEVICES ON PATHS TO A CLIENT SUCH AS FOR USE IN SELECTING A CONTENT SERVER BASED ON A COMMON NETWORK DEVICE

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

With the growing popularity of the Internet, providing speedy access to a requested location on the Internet is fast becoming a significant issue. For example, when a popular web page is hosted by a single computer, the Internet traffic to that computer can be overwhelming. To manage this problem, several computers can be utilized to host the same web page such that each hosting computer, typically referred to as a content server, maintains a copy of the web page. The use of multiple computers to host a network service, such as a web page, is typically referred to as mirrored services. If there are many content servers at the same location, then the network connection to that location can become choked during a time of high Internet traffic. To avoid choking the network connection, mirrored content servers are often located at different sites.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
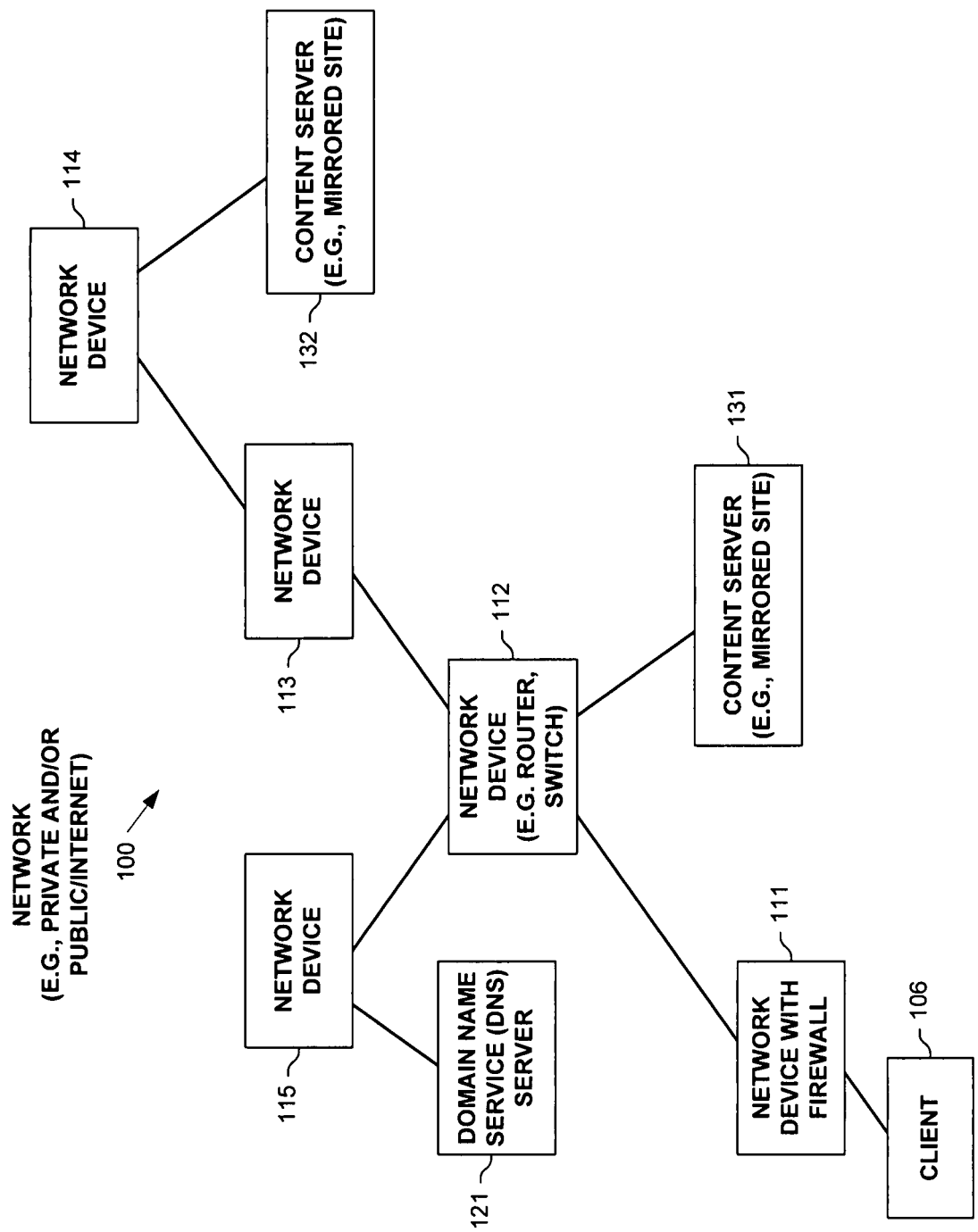
FIG. 1A illustrates an example network configuration useful for explaining the operation of one embodiment.

Disclosed are, inter alia, methods, apparatus, computer-readable media, mechanisms, and means for measuring delays from content servers to network devices on paths to a client such as for, but not limited to, their use in selecting a content server based on a common network device. Moreover, the operations involved in identifying delays to multiple network devices, as well as the operations involved in making a selection based on a delay to a common network device may be used in an extensible number of applications.

One embodiment receives a request for an identification of a content server for supplying content to a client. Multiple content servers in a network are identified as possibly supplying the content to the client, with the network including network devices along different paths between the client and the content servers. In response to the identification of the multiple content servers, a measurement operation is initiated for each content server to determine time delays to multiple network devices among the respective path between the client and the respective content server. The time delays to the network devices corresponding to the content servers are received and analyzed in order to select one of the content servers based on the time delays to one or more network devices common to multiple of the different paths between the client and the content servers.

One embodiment sends multiple packets from a source to a client over a network with each of the packets including a different time to live, and the network including a multiple network devices. Indications are received from multiple of the different network devices that the packets were dropped. For each particular packet sent to the client, the time from sending the particular packet to receiving a corresponding indication that the particular packet was dropped is measured in order to determine the delay between the different network devices and the source along a path between the source and the client. The source may be, but is not limited to a content server or a probe associated with a content server.

2. Description

Disclosed are, inter alia, methods, apparatus, computer-readable media, mechanisms, and means for measuring delays from content servers to network devices on paths to a client such as for, but not limited to, their use in selecting a content server based on a common network device. Moreover, the operations involved in identifying delays to multiple network devices, as well as the operations involved in making a selection based on a delay to a common network device may be used in an extensible number of applications.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-readable media, mechanisms, and means for measuring delays from content servers to network devices on paths to a client such as for, but not limited to, their use in selecting a content server based on a common network device. Moreover, the operations involved in identifying delays to multiple network devices, as well as the operations involved in making a selection based on a delay to a common network device may be used in an extensible number of applications.

One embodiment receives a request for an identification of a content server for supplying content to a client. Multiple content servers in a network are identified as possibly supplying the content to the client, with the network including network devices along different paths between the client and the content servers. In response to the identification of the multiple content servers, a measurement operation is initiated for each content server to determine time delays to multiple network devices among the respective path between the client and the respective content server. The time delays to the network devices corresponding to the content servers are received and analyzed in order to select one of the content servers based on the time delays to one or more network devices common to multiple of the different paths between the client and the content servers. In one embodiment, typically the content server associated with the smallest measured time delay is selected.

In one embodiment, in response to the selection of one of the plurality of content servers, an indication of the selected content server is sent to the client. In one embodiment, the operation of identifying the multiple content servers is performed in response to a domain name service (DNS) request by the client. In one embodiment, the operation of initiating a measurement operation for each content server to determine time delays to the network devices among the respective path between the client and the respective content server includes: initiating, for each particular content server, a probe agent associated with the particular content server to make the determinations of the time delays to multiple network devices among the respective path between the client and the respective content server.

In one embodiment, one or more firewalls exist between the client and the content servers on one or more of the different paths such that probe packets for determining approximate end-to-end delays between the client and one or more of the content servers over one or more of the different paths are blocked. In one embodiment, in response to the received request from the client for the identification of the content server for supplying the content, determining that one or more firewalls exist between the client and the content servers on the different paths such that probe packets for determining approximate end-to-end delays between the client and the content servers over the different paths are blocked; and wherein the operation of initiating the measurement operation for each content server is performed in response to this determination of the existence of the one or more firewalls.

In one embodiment, the time delays to corresponding network devices for at least one of the content servers are determined based on time durations between sending particular packets configured to cause the corresponding network devices to respond and receiving the corresponding responses from the corresponding network devices. In one embodiment, the particular packets are configured to be dropped by the corresponding network devices and their corresponding responses include indications of this dropping of at least one of the particular packets. In one embodiment, the particular packets are dropped based on the expiration of their time to live. In one embodiment, the particular packets are IP datagram packets, and their time to live is identified by a Time To Live (TTL) field in the header of the IP datagram packets.

One embodiment sends multiple packets from a source to a client over a network with each of the packets including a different time to live, and the network including a multiple network devices. Indications are received from multiple of the different network devices that the packets were dropped. For each particular packet sent to the client, the time from sending the particular packet to receiving a corresponding indication that the particular packet was dropped is measured in order to determine the delay between the different network devices and the source along a path between the source and the client. The source may be, but is not limited to a content server or a probe associated with a content server. One embodiment performs the operations of sending the multiple packets, receiving the indications and measuring the time for each particular packet for each of a first source being the source and a second source being a source; comparing the network devices identified by said operations for the first and second sources to identify a common network device of said different network devices common to both the path from the first source to the client and the second source to the client; and comparing said measured time from the first source to the common network device and said measured time from the second source to common network device to identify the relative closeness of the first and second sources to the client.

One embodiment includes: means for initiating a measurement operation for each content server of a plurality of mirrored content servers in a network to determine time delays to a plurality of network devices among the respective path between a client and the respective content server; means for receiving and analyzing said time delays to said network devices corresponding to the plurality of mirrored content servers in order to select one of the plurality of mirrored content servers based on said time delays to network devices common to a plurality of said plurality of different paths between the client and the plurality of mirrored content servers; and means for communicating the indication of said selected content server to the client or said selected content server in response to said selection of one of the plurality of mirrored content servers. In one embodiment, said time delays to corresponding said network devices for at least one of the plurality of content servers are determined based on time durations between sending particular packets configured to cause said corresponding network devices to respond and receiving corresponding said responses from said corresponding network devices.

One embodiment comprises one or more processors and a memory, wherein the memory stores one or more instructions that, when executed by said one or more processors, perform the operations of: receiving a request for an identification of a content server for supplying content to a client; identifying a plurality of content servers in a network for possibly supplying said content to the client, the network including network devices along a plurality of different paths between the client and the plurality of content servers; in response to said identification of the plurality of content servers, initiating a measurement operation for each content server of said content servers to determine time delays to a plurality of network devices among the respective path between the client and the respective content server; receiving and analyzing said time delays to said network devices corresponding to the plurality of content servers in order to select one of the plurality of content servers based on said time delays to network devices common to a plurality of said plurality of different paths between the client and the plurality of content servers; and in response to said selection of one of the plurality of content servers, sending an indication of said selected content server to the client.

In one embodiment, said operation of initiating a measurement operation for each content server of said content servers to determine time delays to the plurality of network devices among the respective path between the client and the respective content server includes: initiating, for each particular content server of said content servers, a probe agent associated with said particular content server to make said determinations of said time delays to a plurality of network devices among the respective path between the client and the respective content server. In one embodiment, said time delays to corresponding said network devices for at least one of the plurality of content servers are determined based on time durations between sending particular packets configured to cause said corresponding network devices to respond and receiving corresponding said responses from said corresponding network devices. In one embodiment, said particular packets are configured to be dropped by said corresponding network devices and their said corresponding responses include indications of said dropping of one of said particular packets.

One embodiment comprises one or more processors and a memory, wherein the memory stores one or more instructions that, when executed by said one or more processors, perform the operations of: sending a plurality of packets from a source to a client over a network with each of the plurality of packets including a different time to live, and the network including a plurality of network devices; receiving indications from a plurality of different network devices of said network devices that plurality of packets were dropped; and for each particular packet of the plurality of packets sent to the client, measuring the time from sending a particular packet to receiving a corresponding said received indication that the particular packet was dropped in order to determine the delay between the plurality of different network devices and the source along a path between the source and the client.

Turning expressly to the figures, FIG. 1A illustrates a network 100, which can use one embodiment for measuring delays to multiple network devices, and possibly use these measured delays to select among multiple content servers. In one embodiment, network 100 is a private network. In one embodiment, network 100 is a public network. In one embodiment, network 100 is a combination of private and public networks. In one embodiment, network 100 includes a portion of the Internet. As shown, network 100 includes a client 106, network devices 111-115 (e.g., routers, switches), a domain name service (DNS) server 121, and mirrored content servers 131-132.

For illustrative purposes, assume client 106 desires content (e.g., web pages, video, music, data, or any other content). In the context of network 100, client 106 makes a request to DNS server 112 to locate the desired content (which, for illustrative purposes, resides on both content servers 131 and 132). DNS server 121 determines that multiple content servers have the content. It must select (either itself or via another server or process, etc.) one of the matching content servers (in this example there are two matching content servers, but in one embodiment, there are more than two content servers having the desired content). DNS server 121 will directly provide or cause the providing of the identification (e.g., IP address, and possibly other information such as a port number, etc.) of one of the content servers 131-132 to client 106.

One mechanism for selecting between content servers 131-132 would be to measure the end-to-end delay between each of content servers 131-132 and client 106, and then to select content server 131 or 132 based on the smaller measured delay. If, however as illustrated in network 100, there is a firewall 111 protecting client 106, it is typically not possible for each of content servers 131-132 to measure the end-to-end delay between itself and client 106. Therefore, one embodiment, possibly in response to identifying that the end-to-end delay measurements are not available, uses another technique to identify which content server 131, 132 to identify to client 106.

One embodiment, determines the time delays (e.g., round trip time delay or other delay measurement) from a common network device to two or more of the content servers, and then selects among these two or more content servers based on the measured delays, typically selecting the content server associated with the smallest delay. One embodiment uses the measured delay as one of multiple factors in selecting between or among the multiple content servers. One embodiment uses pair-wise (or other) delay comparisons to multiple network devices when there is not a network device with a delay measurement made for all content servers. There are many techniques for discovering network devices on a path to a client (e.g., dynamically or predetermined) as well as measuring delay to such network devices. The actual technique(s) used in one embodiment will typically depend on the type of network and its capabilities. For example, in an IP based network, it is possible to dynamically determine network devices on a path to a client by generating probing packets with progressively increasing time to live information, as the dropping network device will return a message that it is dropping a particular probing packet (and the delay from sending the probing packet until the receipt of the drop message can be measured to identify a current round trip delay). Again, the actual technique employed in one embodiment will be selected to match the capabilities of the network and possibly the desired delay measurement granularity.

In the context of network 100, content server 132 makes delay measurements to network devices 111-114, and content server 131 makes delay measurements to network devices 111-112. Network devices 111-112 are common to both paths to client 106, and therefore a comparison of the delays to either network device 111-112 could be made to determine a relative distance/delay to client 106 from content servers 131-132. One embodiment analyzes the measured delays from content servers 131-132 to network device 112 because it is the closest common network device on the respective paths to client 106.

Figure 1B:
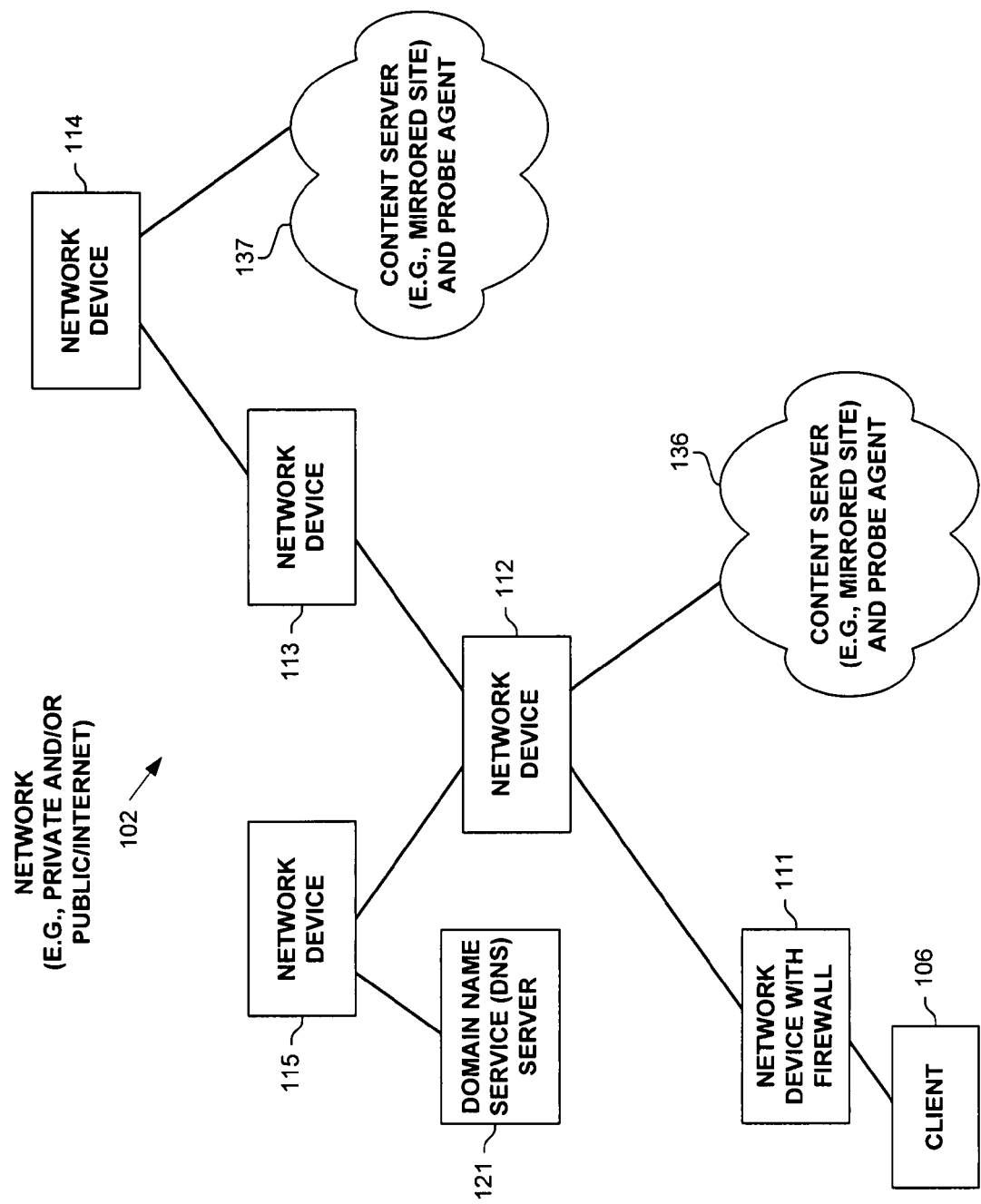
FIG. 1B illustrates an example network configuration useful for explaining the operation of one embodiment.

FIG. 1B illustrates a network 102, which is very similar to network 100 of FIG. 1A, but illustrates that a content server may be associated with probe agents for making the delay measurements. A probe agent can be located on a same or different device or processor than a content server, and is represented as elements 136 and 137 in FIG. 1B, which correspond to elements 131 and 132, respectively, in FIG. 1A. Using a probe agent associated with a content server reduces or eliminates the bandwidth drain on the actual content server and/or its communication resources.

Figure 2:
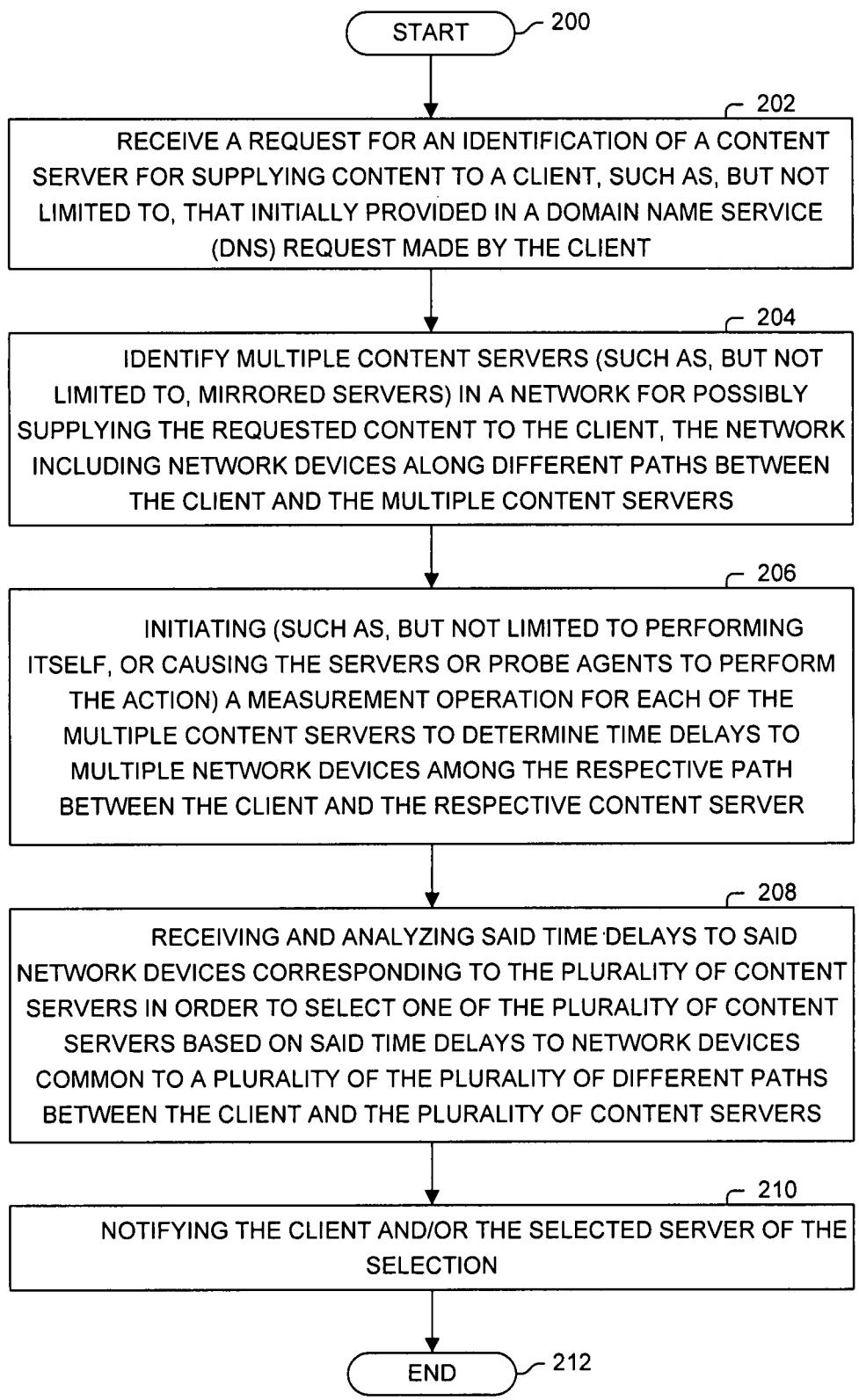
FIG. 2 illustrates an example set of process blocks useful for explaining the operation of one embodiment.

FIG. 2 illustrates a process used in one embodiment for identifying a content server to use for providing a desired content to a client. Processing begins with process block 200, and proceeds to process block 202 wherein received is a request for an identification of a content server for supplying content to a client, such as, but not limited to, that initially provided in a Domain Name Service (DNS) request made by the client. In process block 204, identified are multiple content servers (such as, but not limited to, mirrored servers) in a network for possibly supplying the requested content to the client, with the network including network devices along different paths between the client and the multiple content servers. In process block 206, a measurement operation is initiated (such as, but not limited to performing itself, or causing the servers or probe agents to perform the action) for each of the multiple content servers to determine time delays to multiple network devices among their respective path between the client and the respective content server. In process block 208, these time delays to the network devices corresponding to the content servers are received and analyzed in order to select one of the content servers based on the time delays to network devices common to multiple of the different paths between the client and the content servers. In process block 208, the client and/or the selected server is notified of the selection. For example, one embodiment notifies just the client of the identification of the selected server (e.g., in response to a DNS request from the client). Processing of the illustrated flow diagram is completed as indicated by process block 212.

Figure 3:
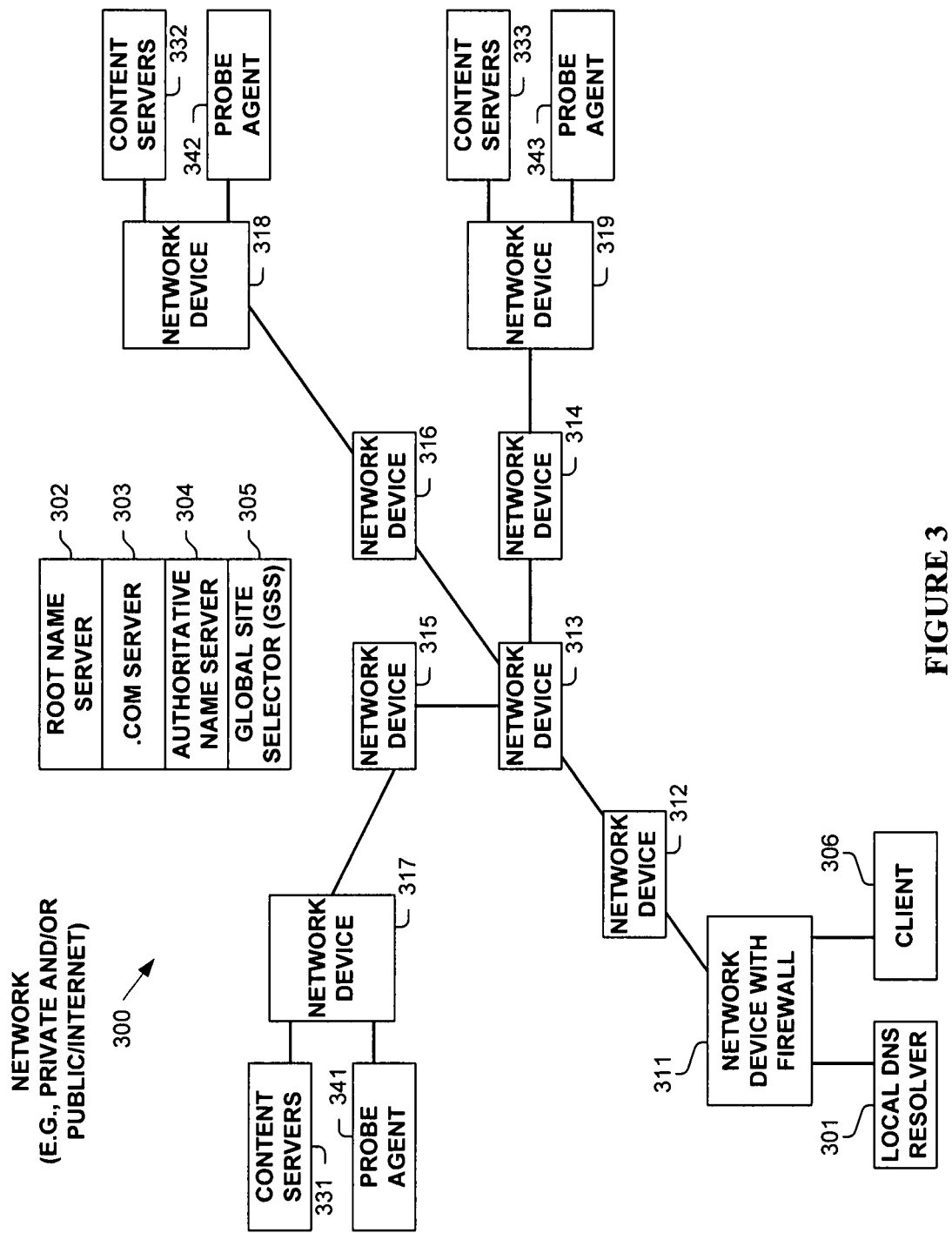
FIG. 3 illustrates an example network configuration useful for explaining the operation of one embodiment.
Figure 4:
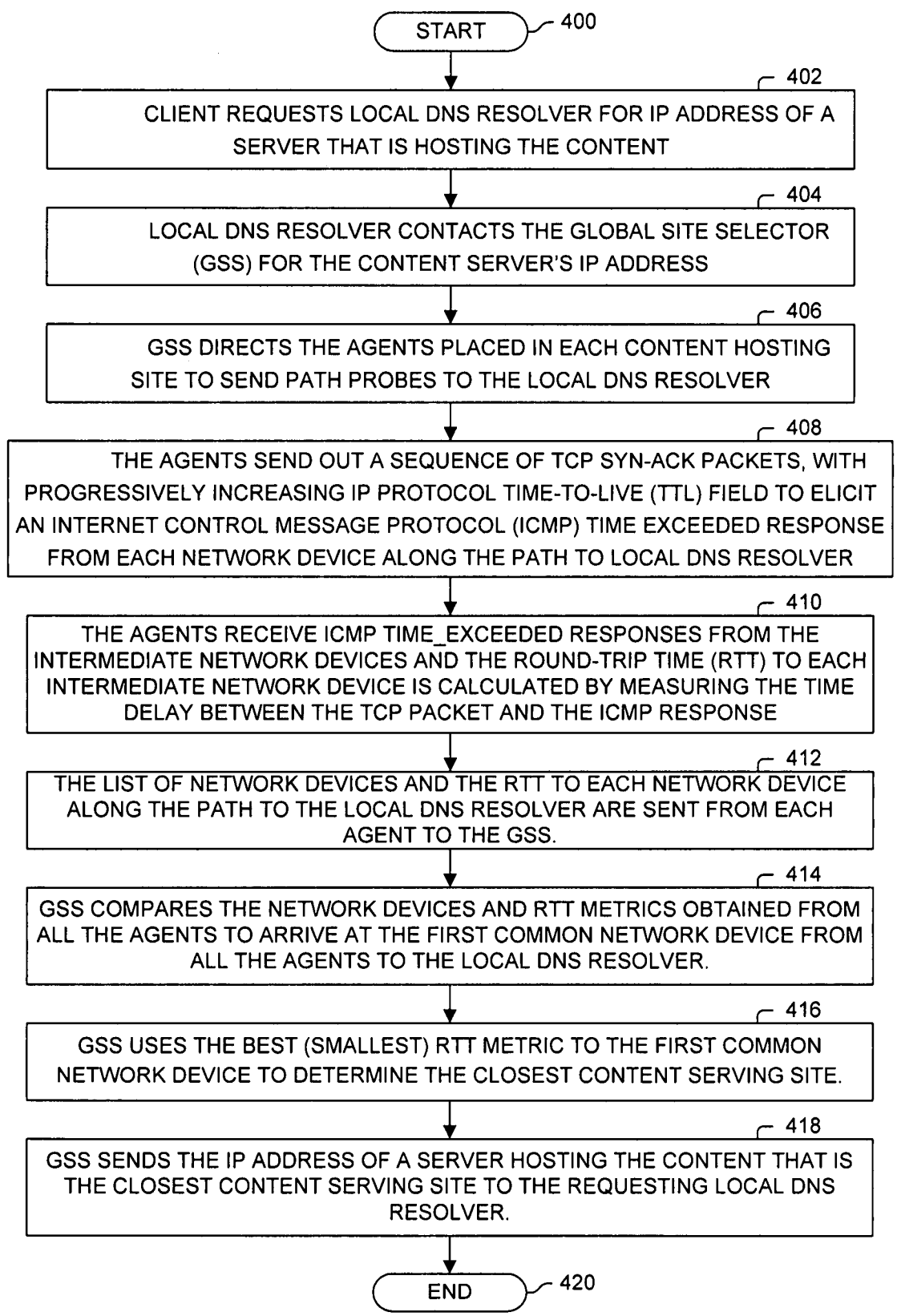
FIG. 4 illustrates an example set of process blocks useful for explaining the operation of one embodiment.

FIG. 3 illustrates another example network 300, which can use one embodiment for measuring delays to multiple network devices, and possibly use these measured delays to select among multiple content servers. In one embodiment, network 300 is a private network. In one embodiment, network 300 is a public network. In one embodiment, network 300 is a combination of private and public networks. In one embodiment, network 300 includes a portion of the Internet. As shown, network 300 includes a client 306, network devices 311-318 (e.g., routers, switches), domain name service (DNS) relates servers/process 301-305, and mirrored content servers 331-333 with their respective probe agents 341-343. The operation of one embodiment using network 300 is illustrated by the flow diagram of FIG. 4, to which we now turn.

Processing begins with process block 400, and proceeds to process block 402, wherein client 306 requests local DNS Resolver 301 for the IP address of a server that is hosting a particular desired content. In process block 404, local DNS Resolver 301 contacts Global Site Selector (GSS) 305 for the content server's IP address. In process block 406, GSS 305 directs probe agents 341-343 associated with each content server 331-333, respectively, in each content hosting site having the desired content to send path probe packets to local DNS Resolver 301 (e.g., illustrating that a surrogate for client 305 may be used as well as client 305). In process block 408, probe agents 341-343 send out a sequence of TCP SYN-ACK packets, with progressively increasing IP protocol Time To Live (TTL) field to elicit an Internet Control Message Protocol (ICMP) time exceeded response from each network device along the respective path to local DNS Resolver 301. In process block 410, probe agents 341-343 receive the ICMP TIME_EXCEEDED responses from the network devices (311-318) and the Round-Trip Time (RTT) delay measurement to each intermediate network device (311-318) is determined by measuring the time delay between sending TCP packets and receiving their corresponding ICMP responses. In process block 412, the lists of network devices (311-318) and the RTT delay measurements along the respective paths to local DNS Resolver 301 are sent from each probe agent 341-343 to GSS 305. In process block 414, GSS 305 compares the network devices and RTT metrics obtained from probe agents 341-343 to determine the first common network device 313 from all probe agents 341-343 to Local DNS Resolver 305. In process block 416, GSS 305 uses the best (smallest) RTT delay measurement to the first common network device (313) to determine the closest content serving site (331-333). In process block 418, GSS 305 sends the IP address of a server (331-333) hosting the content that is the closest content serving site to the requesting local DNS Resolver 301. Processing of the flow diagram is complete as illustrated by process block 420.

Figure 5:
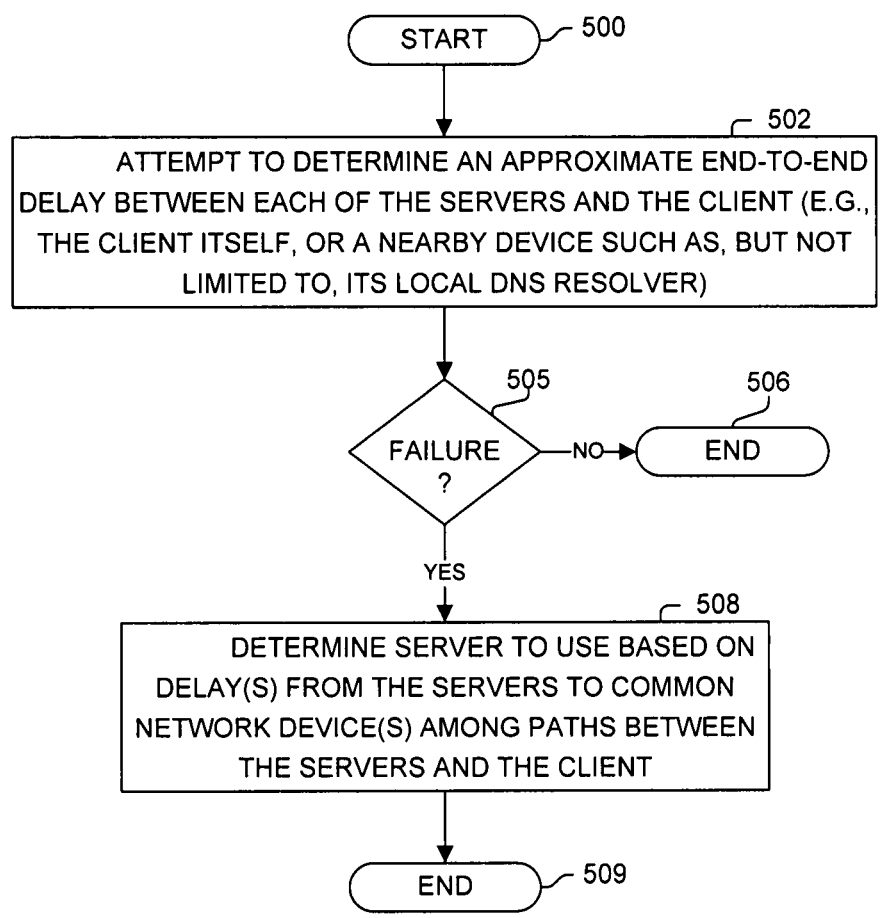
FIG. 5 illustrates an example set of process blocks useful for explaining the operation of one embodiment.

FIG. 5 illustrates a process used in one embodiment for determining whether or not to use end-to-end delay measurements or relative delay measurements to a common network device in determining which content sever to use. Processing begins with process block 500. In process block 502, an attempt is made to determine an approximate end-to-end delay between each of the content servers and the client (e.g., the client itself, or a nearby device such as, but not limited to, its local DNS Resolver). As determined in process block 505, if there is a failure, then in process block 508, a determination of the server to use is made based on delay(s) from the servers to common network device(s) among paths between the servers and the client; and processing is complete as determined by process block 509. Otherwise, processing is complete as represented by process block 506 as the end-to-end delay measurements are available to use.

Figure 6:
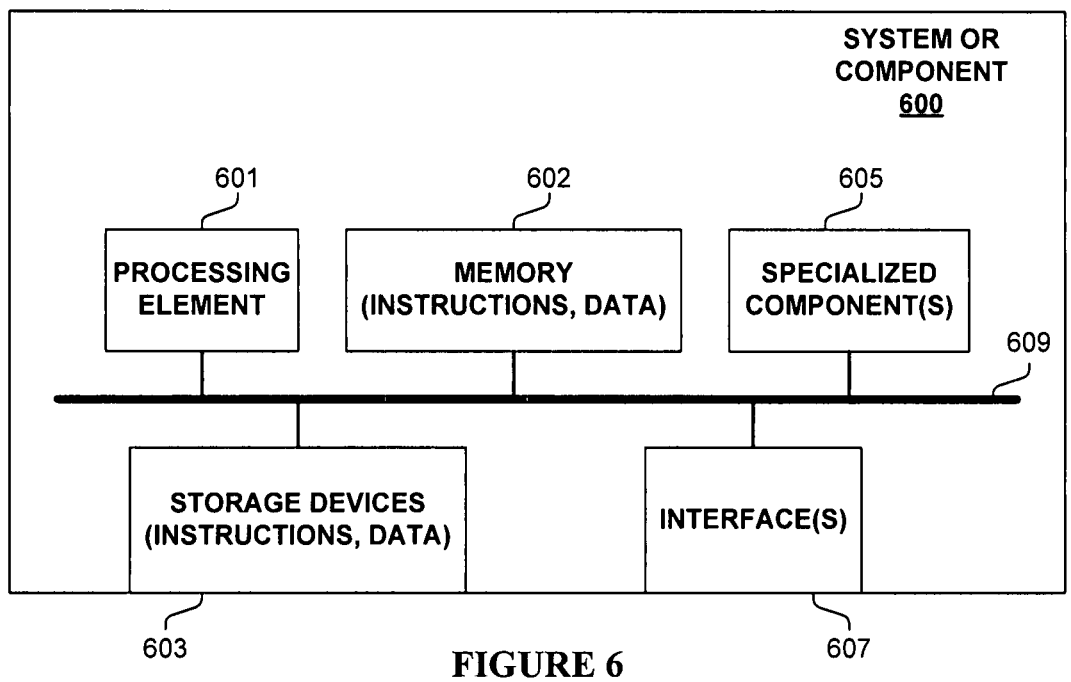
FIG. 6 illustrates an example of a component or system that may be used in conjunction with one embodiment.

FIG. 6 is block diagram of a system or component 600 used in one embodiment that measures delays from content servers to network devices on paths to a client such as for, but not limited to, their use in selecting a content server based on a common network device. In one embodiment, system or component 600 performs one or more processes corresponding to one of the flow diagrams illustrated or otherwise described herein. In one embodiment, system or component 600 corresponds to a DNS process or portion thereof.

In one embodiment, system or component 600 includes a processing element 601, memory 602, storage devices 603, specialized components 605 (e.g. optimized hardware, etc.), and interfaces 607 for sending and receiving packets, which are typically communicatively coupled via one or more communications mechanisms 609, with the communications paths typically tailored to meet the needs of the application.

Various embodiments of component 600 may include more or less elements. The operation of component 600 is typically controlled by processing element 601 using memory 602 and storage devices 603 to perform one or more tasks or processes. Memory 602 is one type of computer-readable medium, and typically comprises random access memory (RAM), read only memory (ROM), flash memory, integrated circuits, and/or other memory components. Memory 602 typically stores computer-executable instructions to be executed by processing element 601 and/or data which is manipulated by processing element 601 for implementing functionality in accordance with an embodiment. Storage devices 603 are another type of computer-readable medium, and typically comprise solid state storage media, disk drives, diskettes, networked services, tape drives, and other storage devices. Storage devices 603 typically store computer-executable instructions to be executed by processing element 601 and/or data which is manipulated by processing element 601 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a particular machine in a network, with the network including a client, a plurality of content servers, and network devices along a plurality of different paths between the client and the plurality of content servers, with the method comprising:
    initiating, by the particular machine, a measurement operation for each particular content server of the plurality of content servers to determine a plurality of delay-measured network devices and time delays to each of the plurality of delay-measured network devices among a respective path of the plurality of different paths, with the respective path being between the client and the particular content server; and
    receiving and analyzing, by the particular machine, an identification of, and measured time delays to, the plurality of delay-measured network devices for each of the plurality of content servers in order to: identify a particular delay-measured network device from said pluralities of delayed measured devices that is common to each of said respective paths between the client and the plurality of content servers; and select one of the plurality of content servers based on a corresponding least value of said measured time delays to the particular delay-measured network device.

2. The method of claim 1, comprising: in response to said selection of one of the plurality of content servers, sending an indication of said selected content server to the client.

3. The method of claim 2, wherein said operation of initiating the measurement operation for each particular content server of the plurality of content servers is performed in response to a domain name service (DNS) request by the client.

4. The method of claim 1, wherein said operation of initiating the measurement operation for each particular content server of the plurality of content servers is performed in response to a domain name service (DNS) request by the client.

5. The method of claim 1, wherein said operation of initiating a measurement operation for each particular content server of the plurality of content servers to determine a plurality of delay-measured network devices and time delays to each of the plurality of delay-measured network devices among a respective path of the plurality of different paths, with the respective path being between the client and the particular content server includes: initiating, for said each particular content server of said content servers, a probe agent associated with said particular content server to make said determinations of the plurality of delay-measured network devices and said time delays.

6. The method of claim 5, wherein one or more firewalls exist between the client and the plurality of content servers on one or more of the plurality of different paths such that probe packets for determining approximate end-to-end delays between the client and one or more of the plurality of content servers over said one or more of the plurality of different paths are blocked.

7. The method of claim 1, including: determining that one or more firewalls exist between the client and the plurality of content servers on the plurality of different paths such that probe packets for determining approximate end-to-end delays between the client and at least one of the plurality of content servers over the plurality of different paths are blocked; and wherein said operation of initiating the measurement operation for each particular content server is performed in response to said determination of the existence of said one or more firewalls.

8. The method of claim 1, wherein said determined time delays to corresponding said delay-measured network devices for at least one of the plurality of content servers are determined based on time durations between sending particular packets configured to cause said corresponding delay-measured network devices to respond, and receiving corresponding said responses from said corresponding delay-measured network devices.

9. The apparatus of claim 8, wherein said particular packets are configured to be dropped by said corresponding delay-measured network devices and their said corresponding responses include indications of said dropping of one of said particular packets.

10. The method of claim 9, wherein said particular packets are dropped based on the expiration of their time to live.

11. The method of claim 10, wherein said particular packets are IP datagram packets, and their time to live is identified by a Time To Live (TTL) field in the header of said IP datagram packets.

12. The method of claim 1, wherein each of said respective paths between the client and the plurality of content servers includes at least one delay-measured network device closer to the client than the particular delay-measured network device.

13. The method of claim 12, wherein the particular delay-measured network device is the delay-measured network device farthest from the client that is common to each of said respective paths between the client the plurality of content servers.

14. A method, comprising:
    sending a plurality of packets from a source to a client over a network with each of the plurality of packets including a different time to live, and the network including a plurality of network devices;

receiving indications from a plurality of different network devices of said network devices that the plurality of packets were dropped;

for each particular packet of the plurality of packets sent to the client and for which an indication was received from one of the plurality of different network devices that said particular packet was dropped, measuring the time from sending said particular packet to receiving a corresponding said received indication that said particular packet was dropped in order to determine the delay between the plurality of different network devices and the source along a path between the source and the client; and performing said operations of sending the plurality of packets, receiving said indications and said measuring the time for each particular packet for each of a first source being the source and a second source being a source; comparing the network devices identified by said operations for the first and second source to identify a common network device of said different network devices common to both the path from the first source to the client and the second source to the client; and comparing said measured time from the first source to the common network device and said measured time from the second source to common network device to identify the relative closeness of the first and second sources to the client.

15. The method of claim 14, wherein said paths from the first source to the client and the second source to the client include one or more particular network devices of the plurality of different network devices from which said indication was received, with said one or more particular network devices being located between the common network device and the client.

16. The method of claim 15, wherein the common network device is the network device of the plurality of network devices, from which a said indication was received, closest to the first source that is common to both said paths from the first source to the client and the second source to the client.

17. An apparatus comprising:

means for initiating a measurement operation for each particular content server of a plurality of mirrored content servers in a network to determine a plurality of delay-measured network devices and time delays to each of the plurality of delay-measured network devices among a respective path between a client and the particular content server;

means for receiving and analyzing an identification of, and measured time delays to, the plurality of delay-measured network devices for each of the plurality of mirrored content servers in order to: identifying a particular delay-measured network device from said pluralities of delayed measured devices that is common to each of said respective paths between the client and the plurality of mirrored content servers; and select one of the plurality of mirrored content servers based on a corresponding least value of said measured time delays to the particular delay-measured network device; and means for communicating an indication of said selected content server to the client or said selected content server in response to said selection of one of the plurality of mirrored content servers.

18. The apparatus of claim 17, wherein said determined time delays to corresponding said delay-measured network devices for at least one of the plurality of mirrored content servers are determined based on time durations between sending particular packets configured to cause said corresponding delay-measured network devices to respond, and receiving corresponding said responses from said corresponding delay-measured network devices.

19. The apparatus of claim 17, wherein at least two particular delay-measured network devices of the plurality of delay-measured network devices are common to each of the paths from the client to the plurality of mirrored content servers; wherein said at least two particular delay-measured network devices includes the particular network device.

20. The apparatus of claim 19, wherein the particular delay-measured network device is the delay-measured network device of said at least two particular network delay-measured devices farthest away from the client.

21. An apparatus, comprising, one or more processors and memory configured for storing one or more instructions that, when executed by said one or more processors, perform operations, with the apparatus being in a network including a client, a plurality of content servers, and network devices along a plurality of different paths between the client and the plurality of content servers, with said operations comprising:

initiating a measurement operation for each particular content server of the plurality of content servers to determine a plurality of delay-measured network devices and time delays to each of the plurality of delay-measured network devices among a respective path of the plurality of different paths, with the respective path being between the client and the particular content server; and receiving and analyzing an identification of, and measured time delays to, the plurality of delay-measured network devices for each of the plurality of content servers in order to: identifying a particular delay-measured network device from said pluralities of delayed measured devices that is common to each of said respective paths between the client and the plurality of content servers; and select one of the plurality of content servers based on a corresponding least value of said measured time delays to the particular delay-measured network device.

22. The apparatus of claim 21, wherein said operation of initiating a measurement operation for each particular content server of the plurality of content servers to determine a plurality of delay-measured network devices and time delays to each of the plurality of delay-measured network devices among a respective path of the plurality of different paths, with the respective path being between the client and the particular content server includes: initiating, for said each particular content server of said content servers, a probe agent associated with said particular content server to make said determinations of the plurality of delay-measured network devices and said time delays.

23. The apparatus of claim 21, wherein said determined time delays to corresponding said delay-measured network devices for at least one of the plurality of content servers are determined based on time durations between sending particular packets configured to cause said corresponding delay-measured network devices to respond, and receiving corresponding said responses from said corresponding delay-measured network devices.

24. The apparatus of claim 23, wherein said particular packets are configured to be dropped by said corresponding delay-measured network devices and their said corresponding responses include indications of said dropping of one of said particular packets.

25. The apparatus of claim 21, wherein each of said respective paths between the client and the plurality of content servers includes at least one delay-measured network device closer to the client than the particular delay-measured network device.

26. The apparatus of claim 25, wherein the particular delay-measured network device is the delay-measured network device farthest from the client that is common to each of said respective paths between the client the plurality of content servers.

* * * * *